June 27, 1939.  E. V. J. TOWER  2,163,991
CLUTCH
Filed Feb. 8, 1934  2 Sheets-Sheet 1
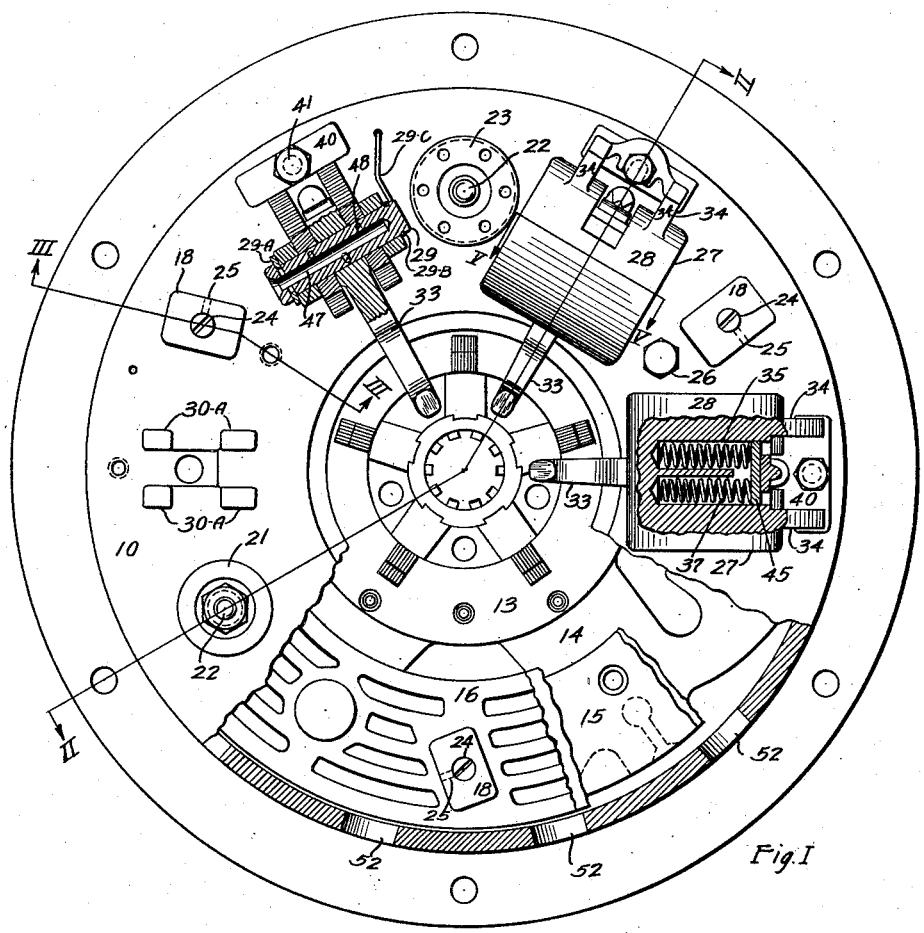
Fig. I
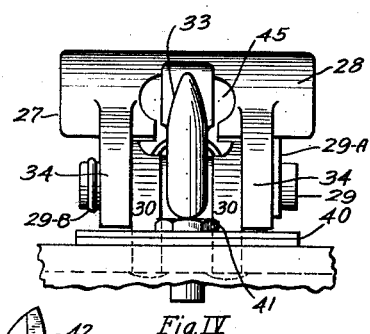
Fig. IV
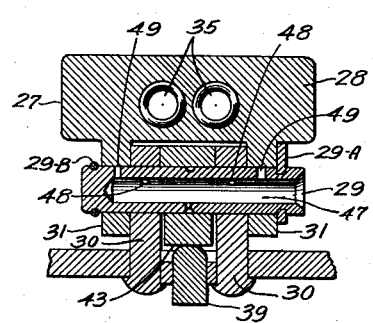
Fig. V
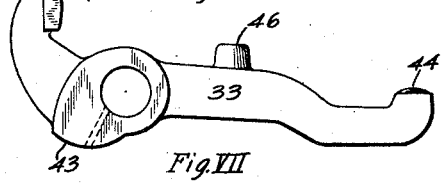
Fig. VII
INVENTOR.
Elmer V. J. Tower.
BY
Carroll R. Taber
HIS ATTORNEY.

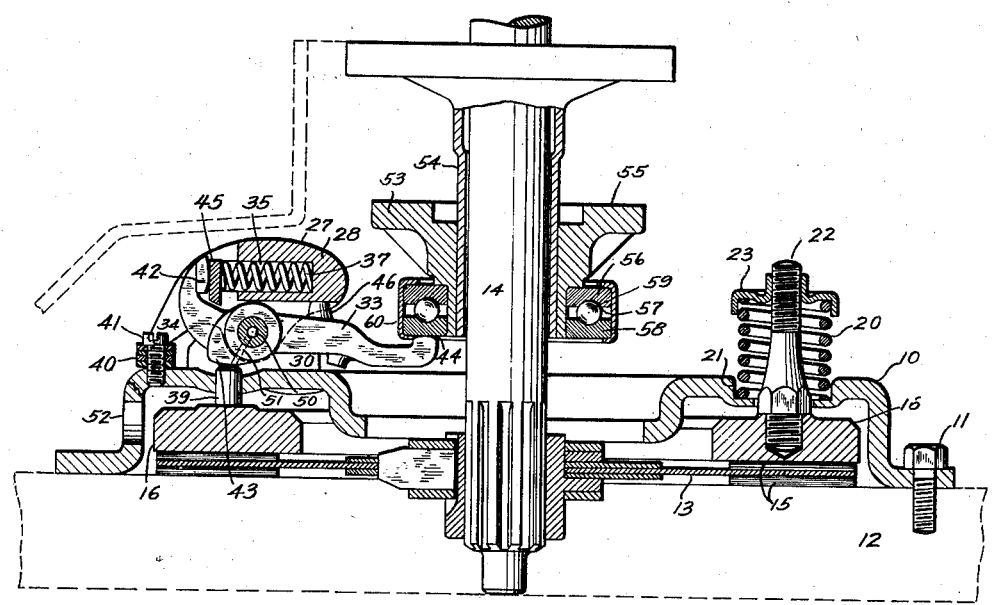

Patented June 27, 1939

2,163,991

UNITED STATES PATENT OFFICE 2,163,991

CLUTCH

Elmer V. J. Tower, Lansing, Mich., assignor to Motor Wheel Corporation, Lansing, Mich., a corporation of Michigan Application February 8, 1934, Serial No. 710,295

6 Claims. (Cl. 192—105)

This invention relates to clutches and more particularly to semi-automatic clutches, that is, combined manual and automatic clutches. The automatic action of the clutch in the present invention is of the type wherein the clutch elements are moved from normal disengaged position into engagement, by the action of centrifugal weights.

However, under the improvements embodied in my invention this engagement is effected by novel mechanism for utilizing controlled centrifugal action to convert the rotary motion of the parts into controlled lateral pressure upon the clutch engaging elements.

Various forms of semi-automatic clutches have been proposed heretofore, depending for their actuation upon the centrifugal movement of weights carried by the rotating parts of the clutch mechanism.

It is among the objects of the present invention to provide improved means, as stated, for controlling the action and the effect of the centrifugally moving parts, and for controlling the lateral pressure exerted on the clutch engaging parts; also to provide improved operation with respect to the clutch engagement at low speeds and ample pressure for high speed requirements; also to provide improved devices whereby foot-pedal declutching is easily made possible with low pedal pressure, regardless of the rotating speed.

Various other objects and the means for attaining the same will appear more fully in the following specifications read in connection with the accompanying drawings, wherein:

Figure I is a plan view of a clutch assembly embodying the present invention with various parts cut away and portions shown in section to more clearly illustrate the details of construction and the relation of the parts;

Figure II is a cross sectional view taken on substantially the line II—II of Figure I and showing the clutch in engaged position;

Figure III is a cross sectional view taken on substantially the line III—III of Figure I and showing the clutch in disengaged position;

Figure IV is an end view of the actuating weight and the motion-conversion mechanism shown in Figures I and II;

Figure V is a cross section through the mechanism shown in Figure IV taken on substantially the line V—V of Figure I;

Figure VI is a side view in elevation of the actuating weights shown in Figures I, II, IV and V;

Figure VII is a side view of the compound lever forming a part of the conversion mechanism; and Figure VIII is a sectional view of the conversion mechanism and associated parts showing the actuating weight in its radially outermost position.

In the preferred embodiment of the present invention as illustrated in the accompanying drawings, a mounting cover 10 is secured by cap screws 11 to a major driving member 12 which is here shown as the fly wheel of a motor vehicle. The driving member 12 is rotated in the usual manner during the operation of the motor vehicle. Between the cover 10 and the fly wheel 12 is positioned a driven member 13 splined to one end of the transmission jack shaft 14. The other end of the jack shaft is connected to and part of a conventional transmission not here shown. The driven member 13 may be of any conventional form and is provided with the usual friction mats 15 adjacent its periphery, and a vibration dampener assembly when required.

A pressure plate 16 which may be formed of cast metal is positioned concentrically between the driven member 13 and the cover 10. It is connected to the mounting cover and rotates therewith. The connection between the pressure plate 16 and the cover 10 is such that the pressure plate is slidable laterally with respect thereto and is normally held out of contact with the friction surface of the driven member 13; that is, the friction surfaces are normally disengaged when the clutch is at rest or is rotated at speeds below a partial engagement point. This connection comprises driving lugs 18 carried by the pressure plate 16 which extend through rectangular openings 19 formed in the top surface of the cover 10 and normal disengagement is effected by means of compression springs 20 positioned on the outside of the cover 10.

The cover 10 is provided with a plurality of circular depressions 21 each having a central opening therethrough. A release and tension and adjusting stud 22 is attached to the pressure plate 16 by screw threaded connection therewith and extends through the central openings in each of the depressions 21. An adjusting cap 23 is secured to the outer threaded extremity of each of the studs 22. The springs 20 are compressed between the bottom of the depressions 21 and the adjusting caps 23 to maintain the pressure plate 16 out of engagement with the friction surface 15 of the driven member 13, whenever the driving member 12 is at rest or is rotating at normal motor idling speeds.

The mechanism thus far described includes a driving member in the form of a fly wheel 12, a driven member 13 having a peripheral friction surface 15 and a pressure plate 16 loosely connected to a mounting cover 10 which rotates with the fly wheel 12. The driven member 13 when at rest normally floats between the fly wheel 12 and the pressure plate 16 and out of engagement with both of these members. This is made possible by reason of the compression springs 20 which normally hold the pressure plate 16 away from the friction surface 15 of the driven member 13. Thus at normal idling speeds, the slow rotary movement of the fly wheel 12, the cover 10 and the pressure plate 16 slidably associated therewith, is not transmitted to the driven member 13. However, when the pressure plate is actuated, as will be described hereinafter, to press against the friction surface 15 of the driven member 13, that member is progressively and securely compressed between the pressure plate 16 and the fly wheel 12 and rotates with these members until idling speeds again obtain. The rotary movement of the friction member is thus transmitted through the shaft 14 to the conventional transmission and drive shaft assemblies, and finally to the driving wheels of the vehicle.

The pressure plate 16 is rotated with the cover 10 by reason of the association therewith of the telescoped driving lugs 18. In order to facilitate the sliding movement of the driving lugs 18 in the finished rectangular openings 19 provision is made for automatically lubricating the contacting surfaces. For this purpose there is provided in each of the driving lugs 18 a central reservoir 24 which may be filled with any suitable heat resisting lubricant such as graphite. A small outlet 25 (see Fig. I) is provided adjacent the bottom of the reservoir 24 to permit the lubricant to work out to the outer trailing surface of the driving lug at the pressure side. In this connection it will be observed that lubrication of only one of the lateral surfaces of the driving lug is required since the rotary movement of the cover 10 is always in the same direction and accordingly the contact between the driving lug and the surface of the cover 10 about the opening 19 is always on the same side of the driving lug. Moreover, it will be observed that since these driving lugs project through the cover 10, lubricant may be inserted in the reservoir 24 conveniently from the outside of the clutch assembly. Any suitable closure for the opening at the upper extremity of the reservoir 24 may be used if desired.

At spaced intervals about the cover 10 screw threaded holes are provided for the reception of adjusting screws 26. By means of these screws the position of the pressure plate 16 relative to the cover 10 and fly wheel 12 may be readily adjusted from the outside of the main housing. In this manner the amount of travel required to bring the pressure plate 16 into contact with the friction surface 15 of the driven member 13 may be varied. Likewise, the adjusting caps 23 are made adjustable on the studs 22, whereby the effectiveness of the springs 20 can be regulated.

The rotary movement of the mounting cover 10 is utilized through means of a plurality of interchangeable conversion units 27 to move the pressure plate 16 into engagement with the friction surface 15 of the driven member 13. The units 27 are referred to as "conversion" units because they are utilized to convert the rotary movement of the cover 10 into a controlled lateral pressure upon the pressure plate 16.

These conversion units 27, as clearly shown in Figure I, are secured to the cover 10 at circumferentially spaced apart intervals adjacent the periphery of the raised section thereof. In the preferred embodiment of the invention six of these units are employed. The number of the conversion units utilized may be varied provided they are positioned on the cover to insure proper static and dynamic balance.

Each of the conversion units includes an actuating weight 28 (see Fig. VI) a compound lever 33 (see Fig. VII) and a pressure pin 39 (see Fig. II). The weights 28 and the levers 33 are pivotally mounted upon pins 29 as will be described presently. When the cover 10 is rotated by reason of its connection with the fly wheel 12 the actuating weights 28 swing radially outward about the pivot pins 29 and cause the cam surfaces on the levers 33 to press the pins 39 against the pressure plate 16. The friction surface 15 of the driven member 13 is thereby brought into engagement progressively with both the fly wheel 12 and the pressure plate 16.

Each of the pins 29 is supported near its opposite extremity by a pair of stamped yokes 30 having legs extending through openings 30a in the cover 10 and secured rigidly thereto. The pins 29 are supported so that their mid portion is normally at right angles to the radius of the cover 10.

Each weight 28, as shown in Fig. V, has a pair of yokes projecting from its under side. Identical machined openings 32 (see Fig. VI) are formed in each of these depending portions for the reception of the pin 29.

The pin 29 is preferably formed with an annular groove (see Fig. V) at each end into one of which a flat and U-shaped key 29a is inserted. After the weight 28 and lever 33 have been mounted upon the pin in assembly position, a spring 29b is inserted into the annular groove at the opposite trailing extremity of the pin. The key and spring thus lock the weight and pin in position. The spring 29b also has a further function which will be described presently.

The center of mass of each of the weights 28 is radially inward of the pin 29 upon which it is pivotally mounted. When the cover 10 is rotated with the fly wheel 12 the weights 28 swing outwardly about the pins 29. In order to limit undue outward movement of the weights 28 each weight is provided with a pair of spaced apart arms 34 at their radially outermost extremity, see Figs. I and IV. An adjustable stop consisting of a plurality of strips 40 of any suitable non-metallic material is secured to the upper surface of the cover 10 immediately beneath the arms 34, see Figs. I, II and IV. These strips are held in position by means of a cap screw or stud 41 extending through the strips and threaded into a hole provided for that purpose in the cover 10. A sufficient number of strips 40 will be used to limit the pivotal movement of the weight 28 to the desired extent.

A pair of substantially cylindrical parallel recesses 35 are formed at the radially outer side of each of the weights 28, see Figs. I, II and V. These recesses are adapted to receive twin compression springs 37. As will appear from the further description which follows, a single recess and a single spring or a greater number of recesses with a greater number of springs may be used, if desired, instead of the two recesses and springs just described.

The compound lever 33 previously mentioned is also pivotally mounted upon the pin 29 and serves through the coacting springs 37 as a connecting or relay transmitting element between each of the weights 28 and the associated pressure pin 39. The levers 33 also serve as release levers to disengage the clutch by pedal operation, which function of the levers will be described below.

Each of the levers 33 is mounted centrally upon one of the pins 29 intermediate the depending portions 31 of the associated weight 28 and beneath the main body of such weight.

As shown in Figs. II and VII, each lever 33 is provided with a definitely formed pressure pad 42 at its extremity adjacent the springs 37 and also formed with a cam surface 43 to actuate the pin 29, and an oppositely extending lever arm formed with a pad 44. As is clearly shown in said figures, the short end of lever 33 carrying pad 42 is shaped so that pad 42 will be disposed adjacent the radially outerside of the associated weight 28. Intermediate the pad 42 and the springs 37 and positioned in a suitable cut-out position of the weight 28 is disposed a release bar 45. As will appear presently this elliptically-shaped release bar 45 is held in contact with the pad 42 at all times by means of the springs 37, and is guided centrally in the elliptical shaped openings provided by the said cut-out portion of the twin cylindrical recesses. The cam surface 43 engages the upper surface of the pressure pin 39. The pin 39 is slidably mounted in an opening formed in a depressed portion of the cover 10 and has its opposite extremity preferably seated against suitably finished bosses formed for that purpose on raised portions of the pressure plate 16 (see Fig. II and VIII).

When the weights 28 are energized due to accelerated rotary motion of the cover 10 they swing outwardly about the pins 29 as a pivot. This weight or mass motion is then immediately converted into stepped up lateral pressure which is transmitted to the pressure pins 39 and thence to the pressure plate 16 through the pad 42 and the cam surface 43 acting as an integral bell crank lever. In converting and transmitting this weight mass motion into lateral pressure, the effective leverage ratio of the lever 33 between the pad 42 and the cam surface 43 is preferably 1.7 to 1 with a given weight mass. However, this ratio will vary depending upon increased rotation of the pressure cam 43 which rotation changes the point of contact of the cam 43 on the surface of the pressure pin.

The springs 37 are preloaded or packed into place under initial compression when the conversion unit is assembled. The release bar 45 is accordingly pressed against the pad 42 at all times. This preloading or initial compression of the springs 37 is maintained by means of a projection 46 (see Figs. II and VII) on the uppper surface of the lever 33 which projection 46 normally contacts the under surface of the adjacent weight 28, and the parts held in such normal position by the compressed springs 37.

The conversion units 27 are adapted first to bring the clutch parts into lateral engagement and thereafter, as the motor is accelerated, to exert an added lateral pressure against the pressure plate whereby peak torque loads are handled without slippage.

These advantages are obtained by reason of the manner in which the conversion units are constructed. As previously mentioned the springs 37 are assembled in the weights 28 under initial compression. Thus, when the cover 10 is rotated the weights 28 and levers 33 move substantially as a one piece unit. This relation obtains until the pins have pressed the clutch parts into firm engagement satisfactory for operation at low rotating speeds. This operative engagement of the clutch parts as shown in Figure II is accomplished before the weight arms 34 strike the stops 40.

At the higher rotating speeds or in response to sudden acceleration (peak torque loads) the weights 28 move radially outward until the arms 34 strike the stops 40 as clearly shown in Figure VIII. Since the clutch parts have previously been operatively engaged this further movement of the weights 28 morely increases the compression of springs 37 thereby increasing the lateral pressure of pins 39 against pressure plate 16. This increased lateral pressure effectively prevents slippage regardless of the torque load placed on the clutch.

The relation of the various parts of the conversion units under both of the conditions mentioned above, i. e., when clutch parts are merely held in operative relation and when clutch parts are subjected to added lateral pressure, are clearly shown in Figures II and VIII, respectively. So long as the weights 28 and levers 33 move as a unit the parts remain in the relations shown in Figure II with the inner side of the weight contacting the stop carried on the upper surface of lever 33. However, when the weights move to their radially outermost position whereby the springs 37 are further compressed and additional pressure is applied to plate 16 through pins 39, the inner side of weights 28 are spaced from the stops carried on the upper surface of levers 33.

From the foregoing description it will be apparent that the weights 28 are energized as the result of centrifugal force or the rotary motion of the cover 10. The movement of the weights 28 is utilized to actuate the lever 33 through the interposed springs 37 at the pad 42; and this movement of the lever 33 acts through the cam surface 43 and associated pin 39 to convert such movement into lateral and controllable pressure which is finally exerted in stepped-up amount against the pressure plate 16.

It will be observed that the force created by the movement of the weight 28 is transmitted to the pad 42 solely through the springs 37. This relation of the springs 37 to the weight 28 and the pad 42 of lever 33 is advantageously utilized in effecting declutching or the release of the pressure plate 16 as hereinafter described. Moreover by arranging the springs 37 in the weights 28 whereby the springs also are subject to the effect of centrifugal force, they in effect automatically boost their own effectiveness through the action of their own mass together with the pressure bars 45, and work in unison with the normal weight and lever motion, to become effective for clutch engagement and pressure whenever the rotary motion of the mounting cover is accelerated such as during all operating speeds above idling speed.

The effectiveness of this mechanism for converting rotary motion into controlled lateral pressure just described is materially augmented by the lubricating system now to be described. As shown in Figures I, II, and V each of the pins 29 is provided with a central recess 47 adapted to receive a suitable lubricant. This lubricant is delivered from said central recess through holes 48 to the bearing surfaces in the yokes 30 and through holes 49 to the bearing surfaces in the depending portions 31, and to the cam surface 43 through an opening 50 which communicates with a passage 51 in the central portion of the lever 33. In this manner lubrication is automatically brought to each of the bearing surfaces in the conversion mechanism as well as to the cam surface 43.

The clutch as a whole is designed to facilitate the dissipation of heat whereby to make the same more effective and prolong the life of the operating parts. The conversion units 27 are mounted exteriorly of the cover 10 where they are remote from and not subjected to the heat generated within the clutch cover. The cover 10 is provided with a plurality of ventilating openings 52 (see Fig. I) at circumferentially spaced apart intervals about the periphery thereof. Thus, when the cover is rotated a circulation of air is set up within the cover whereby the internal parts of the clutch assembly are cooled.

The description thus far has dealt only with the construction and operation of the mechanism for engaging the clutch or pressing the pressure plate 16 against the friction surface 15 of the driven member 13. There will now be described the construction and operation of the mechanism for disengaging the clutch or withdrawing the pressure plate 16 from contact with the friction surface 15 of the driven member 13.

When the motor with which the fly wheel is connected is not operating or is operating at idling speed the centrifugal force acting upon the actuating weights 28 is not sufficient to energize the weights against the retracting or disengaging force of the release springs 20. But when the speed of the motor is increased slightly the weights are energized sufficiently to gradually overcome the opposing force of said release springs 20. The weights 28 are not deenergized until the motor is again brought to idling speed or stopped completely.

In the operation of a motor vehicle it is not practical to bring the motor to idling speed every time it is desired to disengage the clutch. It is therefore essential that means be provided for disengaging the clutch while the motor is operating at relatively high speed. In the present invention this is accomplished by applying lateral pressure to the pads 44 at the radially inner extremities of the compound levers 33.

A release bearing 53 (see Fig. II) is slidably mounted upon the cylindrical housing 54 enclosing jack shaft 14. The bearing 53 is provided with an annular contact surface 55 engageable with a conventional form of release fork forming part of a conventional clutch-pedal and linkage assembly not here shown. At the forward extremity of the bearing 53 is rigidly attached one-half of a ball bearing race 56 provided with an annular groove 57. A detachable bearing race-portion 58, similar to the member 56 and also having an annular groove is adapted to be positioned as shown in Figure II with a plurality of ball bearings 59 engaging the cooperating grooves in said race parts. The two parts 56 and 58 of the ball bearing race are held in the position shown by a cage 60 partially enclosing both halves of the race. The outer surface of the portion 58 engages the pads 44 on the levers 33.

In order to disengage the clutch at speeds above idling speed, it is only necessary to depress the clutch pedal, thereby causing the release fork (above referred to) to engage the contacting surface 55 of the release bearing 53. The release fork acting upon the release bearing in a well-known manner, slides the bearing along the housing 54, thus pressing the outer surface of the member 58 against the pressure pads 44. This pressure against the pad 44 oscillates the lever 33 about its fulcrum pin 29, and moves the cam surface 43 to the right in Fig. II whereby the pressure of the cam against the pin 39 is released. When the pressure of the cam surface 43 on the pressure pin 39 is thus relieved, the springs 20 retract the pressure plate 16, disengaging the clutch.

As previously described, the springs 37 are interposed between the pad 42 and the weight 28 associated therewith. Accordingly, when pressure is exerted against the pad 44 of the longer lever arm of the lever 33, the force required to oscillate the lever 33 about its fulcrum pin 29 is that which will be sufficient to further compress the springs 37.

At the higher rotating speeds of the engine, the weights 28 have moved outwardly so far that their projection 34 will abut against the stop strips 40, so that thereafter no greater centrifugal pressure will be exerted against the pressure plate of the clutch, except the force resulting from centrifugal action on the springs 37; and the release pedal for declutching never has a greater force to overcome than to compress the springs 37. In this manner it is possible to effect declutching without overcoming the force resulting from the energization of the weights 28 which, as will be understood, becomes very great at high speeds.

The clutch may be manually disengaged as just described. It may also be engaged manually (as in conventional clutches) by resisting the movement of the clutch foot pedal when the motor is accelerated. If the clutch foot pedal is depressed at the time the motor is accelerated the movement of weights 28 merely compresses springs 37 and does not bring the clutch parts into engagement. Engagement of the clutch parts may then be accomplished by releasing the clutch foot pedal in the usual manner.

The effective ratio of the levers 33 between the pads 44 and the pad 42 is preferably approximately 3.2 to 1. This ratio will of course be adjusted for accommodation to clutches of various sizes and the size of the release bearing utilized therewith.

The complete operation of the clutch illustrating the prefered embodiment of the present invention may be described briefly as follows:

The clutch is normally maintained in disengaged relation by the springs 20 which hold the pressure plate away from the friction surface 15 of the driven member 13. This relation of the pressure plate 16 and the driven member 13 is illustrated in Figure III. The pressure plate is maintained out of engagement with the friction surface of the driven member at all times except when the motor, with which the fly wheel 12 is associated, is operated at other than idling speed.

When the motor is accelerated, the rotary motion of the mounting cover 10 energizes the actuating weights 28 to pivot about their pivot pins 29. When the weights 28 are thus actuated, pressure is applied to the pads 42 through the compression springs 37 and the levers 33 are pivoted about the pins 29 whereby the cam surfaces 43 exert a pressure against the pressure pins 39. The pins 39 in turn press the pressure plate 16 into engagement with the friction surface of the driven member whereby said driven member is firmly locked between the pressure plate and the fly wheel.

The pivotal movement of the weights 28 about the pins 29 is limited, as above referred to, by the stops consisting of the strips 40. The number of these strips may be increased or decreased as desired. As the friction surfaces of the driven member 13 wear away the number of strips 40 will be decreased to permit a greater oscillation of the weights 28 which causes in turn a greater oscillation of the levers 33, thereby bringing into contact with the pressure pins 39 an adequate portion of the cam surface 43.

However, due to the inclined or accelerating nature of the cam surface, the required degree of oscillation is lessened progressively as the friction surfaces wear, so that a minimum lever motion obtains at the pad 44.

The disengagement of the pressure plate 16 from the friction surface 15 of the driven member 13 may be accomplished by bringing the motor and fly wheel 12 to idling speed or rest, whereby the weights 28 are deenergized, or such disengagement may be effected by manual operation of the conventional clutch pedal. In the former case, the operation of the conversion mechanism 27 will be the reverse of that just described, the springs 20 and 29b serving to return the weights to their inoperative position. In the case of disengagement by the clutch pedal the actuating weights 28 remain in their radially extended position, as shown in Figure II, and sufficient pressure is exerted by the foot pedal to shift the race member 58 to press upon the pads 44 on the levers 33, and thereby to rotate the cam surface 43 against the force of springs 37 whereby to relieve the pressure of the cam surface against the pressure pins 39. When the pressure against the pressure pins is relieved the force of the springs 20 is sufficient to retract the pressure plate 16. The actuating weights 28 will not return to their inoperative position until the motor has been decelerated to idling speed.

It will also be noticed that since the springs 37 are packed in their sockets under initial compression, this spring pressure operates upon the outer end of lever 33 (viz. pad 42) to maintain the inner end of lever 33 closely against the weight 28, i. e. the stop 46 on lever 33 is thus held against the weight 28 as shown in Fig. II. Therefore all of these parts normally move together under the centrifugal action, viz.—the weights, the springs, the bar 45, and the lever 33.

It will be observed from the foregoing description that parts are arranged whereby to permit a control of the centrifugal force and through the conversion units a control of the amount and character of the lateral pressure into which the rotary movement is converted, thus making a more effective and more satisfactorily operating clutch, both for automatic and manual operation.

This invention thus provides a semi-automatic clutch wherein effective and satisfactory controlled engagement of the clutch parts is accomplished at all rotating speeds and wherein peak starting and accelerating torque loads are handled without undue slippage through the governing means provided.

I claim:

1. In a clutch, the combination with a driving member and a mounting cover rigidly connected thereto, of a pressure plate interposed between said driving member and said mounting cover, said pressure plate having a slidable connection with said mounting cover; and means associated with said pressure plate for automatically delivering lubricant to the slidably contacting surface of the pressure plate and the mounting cover.

2. In a clutch, a driving member, a driven member, a housing inclosing the driven member, and a plurality of self contained centrifugally operated conversion units mounted on the outside of said housing for pressing the driven member against the driving member, said conversion units comprising a plurality of separate parts normally held in predetermined relation to each other by means of compressed springs contained wholly within the conversion units.

3. In a clutch, the combination with driving and driven members of a plurality of centrifugally operated conversion units for pressing the driven member against the driving member, said conversion units comprising a plurality of separate parts normally held in predetermined relation to each other by means of compressed springs contained within a recess in one of said parts, and means for disengaging the driving and driven members comprising a pedal operated lever acting directly upon a part only of said conversion units to overcome the centrifugal forces of some but not all of the parts of the conversion units.

4. In a clutch, a driving member, a driven member, and a plurality of self-contained centrifugally operated conversion units secured to said driving member for pressing the driven member against the driving member, said conversion units comprising a plurality of separate parts normally held in predetermined relation to each other by resilient means contained within a recess in one of said parts.

5. In a clutch, a driving member, a driven member, and a plurality of self-contained centrifugally operated conversion units secured to said driving member for pressing the driven member against the driving member, said conversion units comprising a plurality of separate parts one of which is a centrifugally actuated weight having a recess therein, said conversion units being normally held in predetermined relation to each other by resilient means contained within the recesses in said weights.

6. In a clutch, a driving member, a driven member, a housing enclosing the driven member, and a plurality of self-contained centrifugally operated conversion units mounted on the outside of said housing for pressing the driven member against the driving member, said conversion units comprising a plurality of separate parts normally held in predetermined relation to each other by resilient means contained within a recess in one of said parts.

ELMER V. J. TOWER.